US008916306B2

(12) United States Patent
Orihashi et al.

(10) Patent No.: US 8,916,306 B2
(45) Date of Patent: Dec. 23, 2014

(54) FUEL CELL SYSTEM AND CONTROL METHOD THEREOF

(75) Inventors: Nobuyuki Orihashi, Toyota (JP); Masahiro Takeshita, Susono (JP); Hiroyuki Yumiya, Nagoya (JP); Takashi Yamamoto, Okazaki (JP)

(73) Assignee: Toyota Jidosha Kabushiki Kaisha, Toyota-Shi (JP)

( * ) Notice: Subject to any disclaimer, the term of this patent is extended or adjusted under 35 U.S.C. 154(b) by 581 days.

(21) Appl. No.: 12/293,466

(22) PCT Filed: Mar. 23, 2007

(86) PCT No.: PCT/JP2007/057002
§ 371 (c)(1),
(2), (4) Date: Oct. 8, 2008

(87) PCT Pub. No.: WO2007/116814
PCT Pub. Date: Oct. 18, 2007

(65) Prior Publication Data
US 2009/0092868 A1 Apr. 9, 2009

(30) Foreign Application Priority Data
Mar. 28, 2006 (JP) .................... 2006-089023

(51) Int. Cl.
*H01M 8/04* (2006.01)
(52) U.S. Cl.
USPC ........................................ 429/429; 429/432
(58) Field of Classification Search
CPC ....... H01M 8/04223–8/04268; H01M 8/04955
USPC .................. 429/428, 429, 430, 432
See application file for complete search history.

(56) References Cited

U.S. PATENT DOCUMENTS

| 6,881,508 B2 * | 4/2005 | Penev ........................ 429/423 |
| 2005/0106424 A1 | 5/2005 | Elhamid et al. |

FOREIGN PATENT DOCUMENTS

| DE | 101 96 359 T1 | 7/2003 |
| JP | 5-251102 A | 9/1993 |
| JP | 9-199151 A | 7/1997 |
| JP | 2003-515873 A | 5/2003 |
| JP | 2004-6166 A | 1/2004 |
| JP | 2004-158274 A | 6/2004 |
| JP | 2004-172028 A | 6/2004 |
| JP | 2004-179054 A | 6/2004 |
| JP | 2004158274 * | 6/2004 |
| JP | 2004179054 * | 6/2004 |
| JP | 2005-158553 A | 6/2005 |
| JP | 2005-222707 A | 8/2005 |
| JP | 2005-268086 A | 9/2005 |

* cited by examiner

*Primary Examiner* — Ula C. Ruddock
*Assistant Examiner* — Thomas H. Parsons
(74) *Attorney, Agent, or Firm* — Kenyon & Kenyon LLP

(57) ABSTRACT

It is prevented that when a system is left unused, carried carbon ion a cathode-side catalyst to lower a power generation performance. The molar quantities of hydrogen and oxygen in a fuel gas supply/discharge system and an oxidizing gas supply/discharge system with respect to a fuel cell are calculated, and control is performed so that the molar ratio of hydrogen and oxygen which can chemically be reacted in a fuel gas and an oxidizing gas during the stop of the fuel cell is 2 or more. Hydrogen is preferably supplied in accordance with the magnitude of a cell voltage in the fuel cell so as to maintain the molar ratio. Moreover, a gas passage in the oxidizing gas supply/discharge system is preferably provided with an inlet valve and an outlet valve for sealing the oxidizing gas in the gas passage.

9 Claims, 3 Drawing Sheets

FUEL CELL SYSTEM AND CONTROL METHOD THEREOF

This is a 371 national phase application of PCT/JP2007/057002 filed 23 Mar. 2007, which claims priority to Japanese Patent Application No. 2006-089023 filed 28 Mar. 2006, the contents of which are incorporated herein by reference.

BACKGROUND OF THE INVENTION

1. Field of the Invention

The present invention relates to a fuel cell system and a control method thereof. More particularly, it relates to the improvement of the operation technology of the fuel cell system.

2. Description of Related Art

It has heretofore been general to stop the operation of a fuel cell in a case where a fuel cell system is left unused. Moreover, a technology is known in which hydrogen is replenished, in a case where while the operation of the fuel cell is stopped in this manner, a hydrogen pressure becomes a predetermined value or less (e.g., see Patent Document 1).

[Patent Document 1] Japanese Patent Application Laid-Open No. 2004-172028

SUMMARY OF THE INVENTION

However, when a fuel cell system is left unused, for example, carried carbon in a cathode-side catalyst is sometimes oxidized. In consequence, the lowering of a power generation performance, for example, the constant lowering of a cell voltage sometimes results. Furthermore, as a result of hydrogen supply in the state in which the system is left unused, the excessive amount of hydrogen is sometimes consumed.

Therefore, an object of the present invention is to provide a fuel cell system in which it can be prevented that carried carbon in a cathode-side catalyst is oxidized to lower a power generation performance at a time when a system is left unused and in which the excessive consumption of hydrogen can be suppressed, and is also to provide a control method of the system.

To solve such a problem, the present inventor has performed various types of investigation. While the system is stopped, air is sucked from a cathode outlet side to enter a fuel cell, and the air sometimes diffuses from a cathode side to an anode side. Then, oxygen in the air becomes involved in an electrochemical reaction, and eventually a voltage (this will be referred to as an abnormal potential in the present description) is generated regardless of the stopped state of the system, which takes part in the oxidation of carried carbon. The present inventor has considered that the lowering of the power generation performance is caused by such a mechanism, has paid attention to such a mechanism to perform further investigation, and has consequently found a technology capable of solving the above problem.

The present invention has been developed based on such a finding, and provides a fuel cell system which is provided with a fuel cell, comprising: calculation means for calculating the molar quantities of hydrogen and oxygen in a fuel gas supply/discharge system and an oxidizing gas supply/discharge system with respect to the fuel cell; and control means for performing control so that the molar ratio of hydrogen and oxygen configured to be chemically reacted in a fuel gas and an oxidizing gas during the stop of the fuel cell is 2 or more.

According to the finding obtained from the above investigation, to prevent the oxidation of carried carbon in the fuel cell as much as possible, it can be said that it is important to prevent as much as possible the occurrence of the electrochemical reaction of hydrogen and oxygen at times other than a necessary time. In this respect, reactions on the anode side and the cathode side at a time when the electrochemical reaction of hydrogen and oxygen is caused in the fuel cell are as follows:

$$2H_2 \rightarrow 4H^+ + 4e^-  \quad \text{[Formula 1]}$$

$$O_2 + 4H^+ + 4e^- \rightarrow 2H_2O \quad \text{[Formula 2]}$$

Therefore, total reaction in the fuel cell can be represented as follows:

$$2H_2 + O_2 \rightarrow 2H_2O \quad \text{[Formula 3]}$$

That is, based on such theoretical formulas, hydrogen and oxygen are reacted at a molar ratio of 2:1. Therefore, this is regarded as one standard, and in the present invention, the control is performed so that the molar ratio of hydrogen and oxygen configured to be chemically reacted in the fuel gas and the oxidizing gas is 2 or more. In this case, a region where the chemical reaction can occur has a so-called hydrogen-rich state in which hydrogen is present more abundantly than oxygen. Therefore, a state can be formed in which oxygen is not consumed in excess of a predetermined amount. For example, in a case where hydrogen is supplied so that the above molar ratio becomes a predetermined value or more to increase the pressure (the partial pressure) of hydrogen, hydrogen can obtain a state more abundant than a usual state. According to the present invention in which the control is performed in this manner, on hydrogen-rich conditions, the oxidation of an electrode catalyst can be suppressed. Moreover, when the molar ratio of hydrogen and oxygen during operation stop is exactly calculated and adjusted, the excessive consumption of hydrogen can be suppressed.

In such a fuel cell system, it is preferable that hydrogen is supplied in accordance with the magnitude of a cell voltage in the fuel cell so as to maintain the molar ratio. The object of the present invention is to inhibit the generation of the abnormal potential at a time when the system is left unused, whereby the carbon oxidation and the constant lowering of the power generation performance are suppressed. Therefore, means for monitoring the cell voltage to perform the control in accordance with the cell voltage is preferable. Moreover, in the present invention, hydrogen is supplied in order to maintain the molar ratio, thereby obtaining a state in which hydrogen is abundantly present.

In the present invention, the calculation means calculates the molar quantities from the volumes of the predetermined sections of gas passages in the fuel gas supply/discharge system and the oxidizing gas supply/discharge system and the pressure of hydrogen or oxygen. According to this calculation means, the molar quantities of hydrogen and oxygen in the fuel gas supply/discharge system and the oxidizing gas supply/discharge system are calculated from these volumes and pressure, and the molar ratio of hydrogen and oxygen can be controlled based on such a calculation result.

Moreover, in the fuel cell system according to the present invention, the gas passage of the oxidizing gas supply/discharge system is preferably provided with an inlet valve and an outlet valve which seal the oxidizing gas in the gas passage. Further in the present invention, the gas passage of the fuel gas supply/discharge system can be provided with a supply valve of the fuel gas. When the valve is used, for example, the oxidizing gas (air as a typical example) can be inhibited as much as possible from flowing from the outlet side of the oxidizing gas supply/discharge system to the fuel cell, and hence it can be prevented that the oxidizing gas diffuses from the cathode side to the anode side and that oxygen become involved in the electrochemical reaction. In consequence, the generation of the abnormal potential during the operation stop (power generation stop) of the fuel cell can be suppressed.

Furthermore, when the valve is provided as described above, the calculation means may calculate the molar quantities from the volume of the predetermined section of the gas passage positioned between the valve and the fuel cell and the pressure of hydrogen or oxygen. In a state in which the gas is sealed in the predetermined passage by the valve, the molar quantities of hydrogen and oxygen can be calculated based on a known value (the volume of the divided predetermined section). Moreover, when the section divided by the valve immediately close to the fuel cell is a target, the volume of the target section becomes minimum, and the molar quantities of hydrogen and oxygen can preferably comparatively precisely be calculated.

Moreover, it is also preferable that hydrogen is supplied in accordance with the stop time of the fuel cell. When the inflow of the air from the outside is not completely suppressed, it is difficult to completely prevent oxygen from causing the electrochemical reaction. In this respect, when the stop time is treated as one parameter and the molar ratio is, for example, periodically controlled into a predetermined value or more, the generation of the abnormal potential can be suppressed.

Furthermore, according to the present invention, a control method of a fuel cell system comprises: calculating the molar quantities of hydrogen and oxygen in a fuel gas supply/discharge system and an oxidizing gas supply/discharge system with respect to a fuel cell; and performing control so that the molar ratio of hydrogen and oxygen configured to be chemically reacted in a fuel gas and an oxidizing gas during the stop of the fuel cell is 2 or more.

DETAILED DESCRIPTION OF PREFERRED EMBODIMENT

A preferable embodiment of the present invention will hereinafter be described with reference to the drawings.

Figure 1:
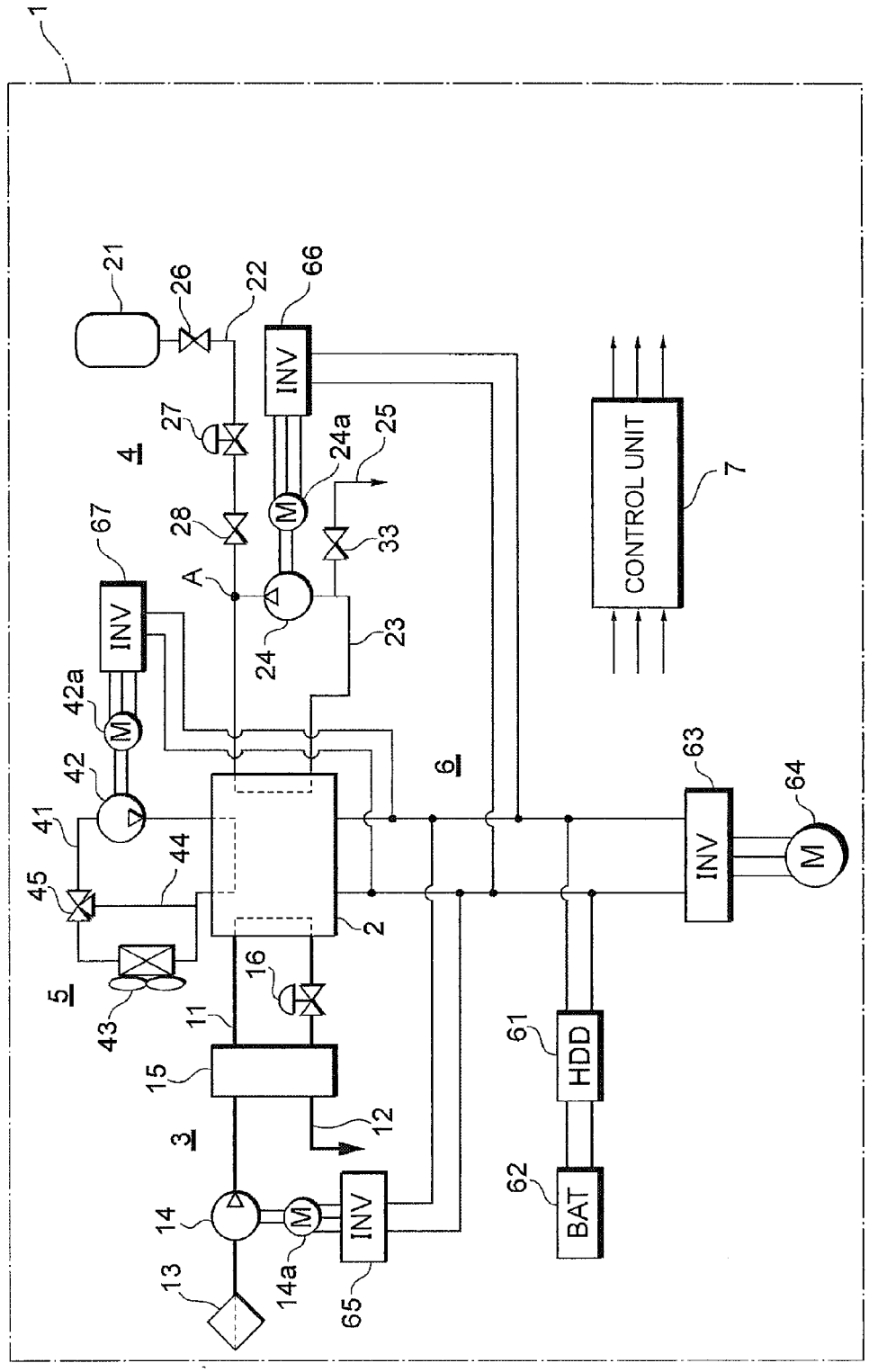
FIG. 1 is a diagram showing the constitution of a fuel cell system in the present embodiment.
Figure 2:
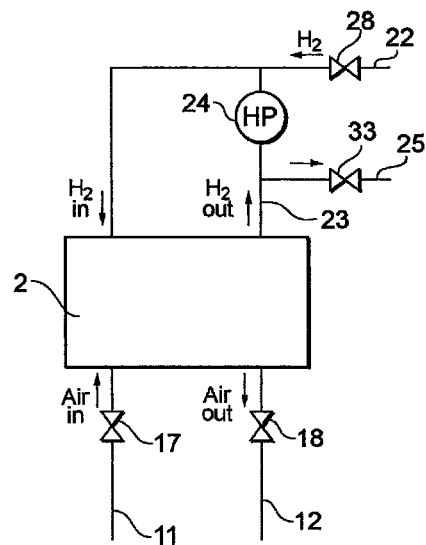
FIG. 2 is a diagram showing the constitution of the peripheral portion of a fuel cell in the fuel cell system.
Figure 3:
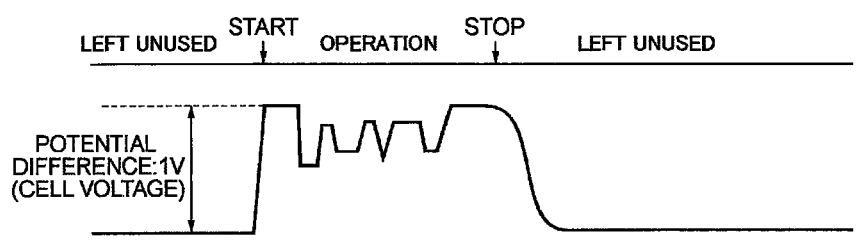
FIG. 3 is a graph showing one example of a cell voltage fluctuation model in the fuel cell system according to the present embodiment.

FIGS. 1 to 3 show the embodiment of a fuel cell system according to the present invention. A fuel cell system 1 according to the present invention has a fuel cell 2; a fuel gas supply/discharge system and an oxidizing gas supply/discharge system with respect to the fuel cell 2; calculation means for calculating the molar quantities of hydrogen and oxygen in these fuel gas supply/discharge system and oxidizing gas supply/discharge system; and control means (hereinafter referred to also as a control unit) 7 for performing control so that the molar ratio of hydrogen and oxygen which can chemically be reacted in a fuel gas and an oxidizing gas during the stop of the fuel cell 2 is 2 or more. In consequence, a phenomenon can be suppressed in which carried carbon in a cathode-side catalyst is oxidized to lower a power generation performance at a time when the system is left unused.

In the following description, the whole constitution of the fuel cell system 1 will first be described, and then the above constitution for suppressing the oxidation of carried carbon and the lowering of the power generation performance will be described.

FIG. 1 shows the schematic constitution of the fuel cell system 1 in the present embodiment. As shown in the drawing, the fuel cell system 1 includes the fuel cell 2, an oxidizing gas supply/discharge system (hereinafter referred to also as the oxidizing gas piping system) 3 which supplies air (oxygen) as the oxidizing gas to the fuel cell 2; a fuel gas supply/discharge system (hereinafter referred to also as the fuel gas piping system) 4 which supplies hydrogen as the fuel gas to the fuel cell 2; a refrigerant piping system 5 which supplies a refrigerant to the fuel cell 2 to cool the fuel cell 2; a power system 6 which charges/discharges the power of the system; and the control unit 7 which generally controls the whole system.

The fuel cell 2 is constituted of, for example, a solid polymer electrolytic type, and includes a stack structure in which a large number of unitary cells are laminated. Each unitary cell of the fuel cell 2 has an air pole on one surface of an electrolyte constituted of an ion exchange film, and a fuel pole on the other surface thereof, and further has a pair of separators so that the air pole and the fuel pole are held between both sides. The fuel gas is supplied to a fuel gas passage of one of the separators, and the oxidizing gas is supplied to an oxidizing gas passage of the other separator. The gases are supplied in this manner to generate power in the fuel cell 2.

The oxidizing gas piping system 3 has a supply path 11 through which the oxidizing gas to be supplied to the fuel cell 2 flows, and a discharge path 12 through which an oxidizing off gas discharged from the fuel cell 2 flows. The supply path 11 is provided with a compressor 14 which takes the oxidizing gas via a filter 13, and a humidifier 15 which humidifies the oxidizing gas fed under pressure by the compressor 14. The oxidizing off gas flowing through the discharge path 12 flows through a back pressure adjustment valve 16 for use in water content exchange in the humidifier 15, and then the gas is finally discharged as an exhaust gas to the atmosphere outside the system. The compressor 14 is driven by a motor 14a to take the oxidizing gas from the atmosphere.

The fuel gas piping system 4 has a hydrogen supply source 21; a supply path 22 through which a hydrogen gas to be supplied from the hydrogen supply source 21 to the fuel cell 2 flows; a circulation path 23 which returns a hydrogen off gas (a fuel off gas) discharged from the fuel cell 2 to a joining part A of the supply path 22; a pump 24 which feeds the hydrogen off gas under pressure from the circulation path 23 to the supply path 22; and a discharge path 25 branched and connected to the circulation path 23.

The hydrogen supply source 21 is constituted of, for example, a high-pressure tank, a hydrogen occluded alloy or the like so that, for example, 35 MPa or 70 MPa of hydrogen gas can be stored. When an original valve 26 of the hydrogen supply source 21 is opened, the hydrogen gas flows out to the supply path 22. The hydrogen gas has a pressure finally reduced into, for example, about 200 kPa by a pressure reduction valve such as a regulator valve 27, and is supplied to the fuel cell 2.

A blocking valve 28 is provided on the upstream side of the joining part A of the supply path 22. The circulation system of the hydrogen gas is constituted by connecting a downstream-side passage of the joining part A of the supply path 22, a fuel gas passage formed in the separator of the fuel cell 2, and the circulation path 23 in this order. The hydrogen pump 24 is driven by a motor 24a to circulate and supply the hydrogen gas from the circulation system to the fuel cell 2.

The discharge path 25 is provided with a purge valve 33 as a blocking valve. The purge valve 33 is appropriately opened during the operation of the fuel cell system 1 to discharge impurities in the hydrogen off gas to a hydrogen diluter (not shown) together with the hydrogen off gas. When the purge valve 33 is opened, the concentration of the impurities in the hydrogen off gas of the circulation path 23 decreases, and the concentration of the hydrogen in the hydrogen off gas to be circulated and supplied increases.

The refrigerant piping system 5 has a refrigerant passage 41 which communicates with a cooling passage in the fuel cell 2; a cooling pump 42 provided in the refrigerant passage 41; a radiator 43 which cools the refrigerant to be discharged from the fuel cell 2; a bypass passage 44 which bypasses the radiator 43; and a changeover valve 45 which sets the passing of cooling water through the radiator 43 and the bypass passage 44. The cooling pump 42 is driven by a motor 42a to circulate and supply the refrigerant in the refrigerant passage 41 to the fuel cell 2.

A power system 6 includes a high-pressure DC/DC converter 61, a battery 62, a traction inverter 63, a traction motor 64 and various auxiliary apparatus inverters 65, 66 and 67. The high-pressure DC/DC converter 61 is a direct-current voltage converter, and has a function of adjusting a direct-current voltage input from the battery 62 to output the voltage to a traction inverter 63 side and a function of adjusting a direct-current voltage input from the fuel cell 2 or the traction motor 64 to output the voltage to the battery 62. These functions of the high-pressure DC/DC converter 61 realize the charging/discharging of the battery 62. Moreover, the high-pressure DC/DC converter 61 controls the output voltage of the fuel cell 2.

In the battery 62, battery cells are laminated to obtain a constant high voltage as a terminal voltage, and a battery computer (not shown) performs control so that the excessive power can be charged or the power can subsidiarily be supplied. The traction inverter 63 converts a direct current into a three-phase alternate current to supply the current to the traction motor 64. The traction motor 64 is, for example, a three-phase alternate-current motor, and constitutes, for example, a vehicle main power source to be mounted on the fuel cell system 1.

The auxiliary apparatus inverters 65, 66 and 67 are electric motor control devices which control the driving of the corresponding motors 14a, 24a and 42a, respectively. The auxiliary apparatus inverters 65, 66 and 67 convert direct currents into three-phase alternate currents to supply the currents to the motors 14a, 24a and 42a, respectively. The auxiliary apparatus inverters 65, 66 and 67 are, for example, PWM inverters of a pulse width modulation system, and convert the direct-current voltage output from the fuel cell 2 or the battery 62 into a three-phase alternate-current voltage in accordance with a control command from the control unit 7, to control rotation torques to be generated by the motors 14a, 24a and 42a.

The control unit 7 is constituted as a micro computer including therein a CPU, an ROM and an RAM. The CPU executes desired computation in accordance with a control program to perform various types of processing and control, for example, thawing control of the pump 24 described later. The ROM stores the control program and control data to be processed by the CPU. The RAM is used as any type of operation region mainly for control processing. The control unit 7 inputs detection signals of various types of pressure, temperature and outside air temperature sensors for use in the gas systems (3, 4) and the refrigerant system 5, to output control signals to constituting elements.

Subsequently, in the present embodiment, the constitution and function of the fuel cell system 1 for suppressing the oxidation of carried carbon and the lowering of the power generation performance will be described (see FIG. 2, etc.).

As described above, in this fuel cell system 1, a phenomenon can be suppressed in which carried carbon in a cathode-side catalyst is oxidized to lower a power generation performance at a time when the system is left unused (during the operation stop of the fuel cell 2). Moreover, to realize this, the molar quantities of hydrogen and oxygen in the fuel gas piping system 4 and the oxidizing gas piping system 3 are calculated, and the molar ratio of hydrogen and oxygen which can chemically be reacted in the fuel gas and the oxidizing gas can be controlled during the stop of the fuel cell 2.

The calculation means for calculating the molar quantities of hydrogen and oxygen in the fuel gas piping system 4 and the oxidizing gas piping system 3 are not especially shown in the drawing, but is constituted of, for example, a gas pressure gauge, a gas analysis meter, a temperature sensor, a hydrogen sensor and the like. Moreover, the calculation based on measured parameter values can be performed by, for example, the above control unit 7. In addition, the hydrogen sensor is sensitive to hydrogen, and detects optical or electric property changes. In general, a semiconductor, burning, optical or resistor sensor is used.

Here, a basic idea during the calculation of the molar quantities of hydrogen and oxygen will schematically be described hereinafter. That is, as to the fuel gas (hydrogen), a molar quantity $nH_2$ of the gas can be obtained from the following state equation:

$$n_{H_2} = P_{H_2} V_{H_2} / R T_{H_2},$$ [Formula 4]

in which $P_{H_2}$ is the pressure (the partial pressure) of the fuel gas, $V_{H_2}$ is a volume, $T_{H_2}$ is a temperature, and R is a gas constant. Similarly, as to the oxidizing gas, a molar quantity $no_2$ of the gas can be obtained from the following state equation:

$$n_{O_2} = P_{O_2} V_{O_2} / R T_{O_2},$$ [Formula 5]

in which $P_{O_2}$ is the pressure (the partial pressure) of the oxidizing gas, $V_{O_2}$ is a volume, $T_{O_2}$ is a temperature, and R is a gas constant.

It is to be noted that the above basic idea is based on a theoretical formula (the state equation) as described above, and is preferably appropriately modified in consideration of another element in a case where the idea is actually applied. For example, with regard to water vapor included in air, as one means for considering a water vapor pressure in the corresponding state, a saturated water vapor pressure can be treated as a so-called approximate value. Moreover, in the present embodiment, the molar ratio is controlled into 2 or more based on the above theoretical formula, but this indicates that the minimum standard of a threshold value (a target value) is 2. A value in excess of 2 may be set in accordance with situations, and a margin for sufficiently suppressing the oxidation of carried carbon and the lowering of the power generation performance can be taken.

Moreover, in the present embodiment, the fuel gas (hydrogen) can be supplied in accordance with the magnitude of the cell voltage in the fuel cell 2. In the present embodiment, an original object is to prevent the generation of the abnormal potential at a time when the system is left unused (during the operation stop of the fuel cell 2), thereby suppressing the carbon oxidation of the catalyst and the constant lowering of the power generation performance. Therefore, when the cell voltage is actually monitored and the fuel gas is appropriately supplied in accordance with the magnitude of the voltage, the abnormal potential can preferably effectively be suppressed. Moreover, as compared with a case where the fuel gas is simply supplied, according to the present embodiment in which the control is performed in consideration of the cell situations, the excessive consumption of the fuel gas can preferably be suppressed.

Furthermore, in the present embodiment, the supply path 11 and the discharge path 12 of the oxidizing gas piping system 3 are provided with an inlet valve 17 and an outlet valve 18, and the oxidizing gas can be sealed in the predetermined section of the gas passage (see FIG. 2). In consequence, when the system is left unused, the oxidizing gas can be sealed in the predetermined section on a fuel cell 2 side divided by these valves 17, 18, and the oxidizing gas can be inhibited as much as possible from flowing (flowing backward) from, for example, the outlet side (the discharge path 12 side) of the oxidizing gas piping system 3. Therefore, it can effectively be prevented that the oxidizing gas diffuses from the cathode side to an anode side and that oxygen becomes involved in an electrochemical reaction.

Moreover, the gas passage of the fuel gas piping system 4 is provided with a supply valve for supplying the fuel gas. For example, in the present embodiment, the above blocking valve 28 (including the regulator valve 27) is used as the supply valve mentioned herein (see FIGS. 1, 2). In this case, the molar quantities can be calculated using the volume of the predetermined section on the fuel cell 2 side divided by the supply valve as $V_{H_2}$ in the formula 4.

It is to be noted that as shown in FIG. 2, in the present embodiment, these inlet valve 17 and outlet valve 18 can be arranged adjacent to the fuel cell 2. In this case, the inlet valve 17 and the outlet valve 18 are further preferably arranged so that the molar ratio of the fuel gas and the oxidizing gas at a time when the system is left unused is 2 or more. For example, when the inlet valve 17 and the outlet valve 18 are arranged immediately close to the fuel cell 2, the volume of the predetermined section on the oxidizing gas side decreases as much as the closeness, and hence the molar ratio can be set to a larger value.

Figure 4:
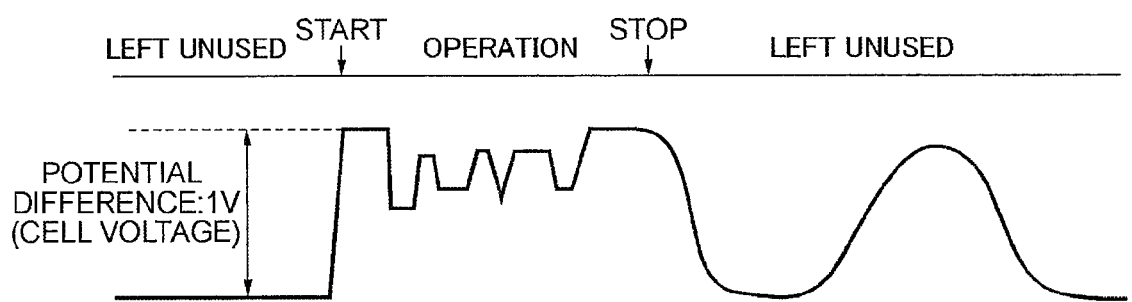
FIG. 4 is a graph for comparison showing one example of the cell voltage fluctuation model in a conventional fuel cell system.

According to the fuel cell system 1 of the present embodiment described above, it can be prevented that carried carbon in the cathode-side catalyst is oxidized to lower the power generation performance at the time when the system is left unused (see FIGS. 3, 4. 1 V shown as a potential difference in the drawing is one example). That is, for example, the oxidizing gas sucked from the cathode outlet side enters the fuel cell 2, and diffuses from the cathode side to the anode side so that oxygen becomes involved in the electrochemical reaction, and the abnormal potential is sometimes generated at the time when the system is left unused as described above (see FIG. 4). On the other hand, in the present embodiment, a region where the gas for use in the electrochemical reaction is present is brought into the hydrogen-rich state to suppress the abnormal potential (see FIG. 3). That is, the molar ratio based on the theoretical formula is used as a standard, and hydrogen is supplied so that the molar ratio exceeds the standard, whereby a so-called hydrogen-rich state is formed in which hydrogen is present more abundantly than oxygen in the region where the electrochemical reaction can occur. In this case, oxygen is not present (or is hardly present) in the vicinity of both the anode and the cathode of the fuel cell 2, and hence the abnormal potential can be suppressed while inhibiting the occurrence of the chemical reaction. In this case, both the anode and the cathode are brought into a hydrogen atmosphere, and both the poles have an equal potential, depending on the situations.

Moreover, the fuel gas (hydrogen) is supplied as described above, whereby the hydrogen pressure can be increased in a situation in which the system is stopped, and the following advantages are obtained. That is, for example, in the present embodiment, the oxidizing gas piping system 3 is provided with the inlet valve 17 and the outlet valve 18 (see FIG. 2). However, even in a case where the oxidizing gas (air) might leak from these valves 17, 18, when the hydrogen pressure is increased in this manner, the leakage of the air can be suppressed. Even if the air leaks, it can be prevented that the air diffuses from the cathode side to the anode side and that oxygen becomes involved in the electrochemical reaction. Therefore, even in a situation in which, for example, the system is left unused for a long time, the leakage amounts in the inlet valve 17 and the outlet valve 18 can be allowed to a certain degree. In other words, a slightly large amount of the fuel gas (hydrogen) is preferably supplied in consideration of the above state.

In addition, according to the fuel cell system 1 of the present embodiment, the excessive consumption of the fuel gas (hydrogen) can advantageously be suppressed. That is, when the fuel gas (hydrogen) is excessively supplied, fuel efficiency improves, and the amount of hydrogen to be discharged from the cathode during restart increases. However, in the fuel cell system 1 of the present embodiment, hydrogen is supplied in accordance with the magnitude of the cell voltage so as to maintain the molar ratio, and hence the excessive consumption can be suppressed.

It is to be noted that the above embodiment is one example of the preferable embodiment of the present invention, but this is not restrictive, and the present invention can variously be modified and implemented without departing from the scope of the present invention. For example, in the above embodiment, the cell voltage is monitored to appropriately supply the fuel gas in accordance with the magnitude of the voltage, but this is merely one preferable example. For example, when it is difficult to monitor the cell voltage or when the system is left unused for a long time, means for supplying hydrogen in accordance with time while the system is left unused (the stop time of the fuel cell 2). An example of such means will be described. That is, with the elapse of each predetermined time, the predetermined amount of hydrogen may be supplied. Moreover, when the piping system is provided with the valves (the inlet valve 17, the outlet valve 18) and the like, it is sometimes difficult to completely suppress the inflow of the air from the outside. However, the system stop time is treated as one parameter in this manner, and the molar ratio can, for example, periodically be controlled so that the ratio becomes the predetermined value or more to suppress the generation of the abnormal potential. Moreover, even when hydrogen is periodically supplied, the excessive consumption of hydrogen can be suppressed, and the fuel efficiency can be increased.

INDUSTRIAL APPLICABILITY

According to the present invention, it can be prevented that carried carbon in a cathode-side catalyst is oxidized to lower a power generation performance at a time when a system is left unused. Moreover, excessive consumption of hydrogen can be suppressed.

Therefore, the present invention can broadly be used in a fuel cell system having such requirements.

The invention claimed is:

1. A fuel cell system which is provided with a fuel cell, and a fuel gas supply/discharge system and an oxidizing gas supply/discharge system with respect to the fuel cell, comprising:
   an inlet valve provided on the side of an oxidizing gas supply path of a gas passage and an outlet valve provided on the side of an oxidizing gas discharge path for a purpose of sealing an oxidizing gas in the gas passage of the oxidizing gas supply/discharge system;
   a supply valve of a fuel gas provided on the side of a fuel gas supply path of the fuel gas supply/discharge system;
   control unit programmed to perform control so that the molar ratio of:
      hydrogen included in the fuel gas of the fuel gas supply/discharge system and configured to be chemically reacted in the fuel cell and
      oxygen included in the oxidizing gas of the gas passage sealed by the inlet valve and the outlet valve and configured to be chemically reacted
      is greater than a minimum standard of 2 during the operation stop of the fuel cell so that both an anode and a cathode of the fuel cell are brought into a hydrogen atmosphere; and
   calculation unit programmed to calculate the molar quantities of hydrogen configured to be chemically reacted in the fuel gas supply/discharge system and oxygen configured to be chemically reacted in the oxidizing gas supply/discharge system,
   wherein the molar ratio based on the theoretical formula is used as a standard,
   wherein the calculation unit is further programmed to calculate hydrogen supply in accordance with the magnitude of a cell voltage in the fuel cell so as to maintain the molar ratio of hydrogen and oxygen as the target value at a minimum standard of more than 2, and
   wherein the control unit is further programmed to form a hydrogen-rich state in which hydrogen is present more abundantly than oxygen in the region where the electrochemical reaction can occur so that both an anode and a cathode of the fuel cell are brought into a hydrogen atmosphere in which oxygen is not present or is hardly present in the vicinity of both the anode and the cathode of the fuel cell, and so that abnormal potential can be suppressed while inhibiting the occurrence of the chemical reaction.

2. The fuel cell system according to claim 1, wherein the calculation unit calculates the molar quantities from the volumes of the predetermined sections of gas passages in the oxidizing gas supply/discharge system and the fuel gas supply/discharge system including the fuel cell and the pressure of hydrogen or oxygen.

3. The fuel cell system according to claim 2, wherein the calculation unit calculates the molar quantities from the volume of the predetermined section of the gas passage positioned between the valve and the fuel cell and the pressure of hydrogen or oxygen.

4. The fuel cell system according to claim 3, wherein the operation stop time of the fuel cell is a parameter, and hydrogen is supplied in accordance with the parameter.

5. The fuel cell system according to claim 2, wherein the operation stop time of the fuel cell is a parameter, and hydrogen is supplied in accordance with the parameter.

6. The fuel cell system according to claim 1, wherein the operation stop time of the fuel cell is a parameter, and hydrogen is supplied in accordance with the parameter.

7. A control method of a fuel cell system which is provided with a fuel cell, and a fuel gas supply/discharge system and an oxidizing gas supply/discharge system with respect to the fuel cell, comprising:
   using an inlet valve provided on the side of an oxidizing gas supply path of a gas passage and an outlet valve provided on the side of an oxidizing gas discharge path for a purpose of sealing an oxidizing gas in the gas passage of the oxidizing gas supply/discharge system, and a supply valve of a fuel gas provided on the side of a fuel gas supply path of the fuel gas supply/discharge system;
   performing control so that the molar ratio of:
      hydrogen included in the fuel gas of the fuel gas supply/discharge system and configured to be chemically reacted in the fuel cell and
      oxygen included in the oxidizing gas of the gas passage sealed by the inlet valve and the outlet valve and configured to be chemically reacted
      is greater than a minimum standard of 2 during the operation stop of the fuel cell;
   calculating the molar quantities of hydrogen configured to be chemically reacted in the fuel gas supply/discharge system and oxygen configured to be chemically reacted in the oxidizing gas supply/discharge system; and
   supplying hydrogen in accordance with the magnitude of a cell voltage in the fuel cell to control the molar ratio of hydrogen and oxygen configured to be chemically reacted in the fuel gas and the oxidizing gas during the stop of the fuel cell,
   wherein the molar ratio based on the theoretical formula is used as a standard, and
   wherein hydrogen is supplied in accordance with the magnitude of a cell voltage in the fuel cell so as to maintain the molar ratio of hydrogen and oxygen as the target value at a minimum standard of more than 2, and a hydrogen-rich state is formed in which hydrogen is present more abundantly than oxygen in the region where the electrochemical reaction can occur so that both an anode and a cathode of the fuel cell are brought into a hydrogen atmosphere in which oxygen is not present or is hardly present in the vicinity of both the anode and the cathode of the fuel cell, and so that abnormal potential can be suppressed while inhibiting the occurrence of the chemical reaction.

8. A fuel cell system which is provided with a fuel cell, and a fuel gas supply/discharge system and an oxidizing gas supply/discharge system with respect to the fuel cell, comprising:
   an inlet valve provided on the side of an oxidizing gas supply path of a gas passage and an outlet valve provided on the side of an oxidizing gas discharge path for a purpose of sealing an oxidizing gas in the gas passage of the oxidizing gas supply/discharge system;
   a supply valve of a fuel gas provided on the side of a fuel gas supply path of the fuel gas supply/discharge system;
   control unit programmed to perform the target value of the molar ratio of:
      hydrogen included in the fuel gas of the fuel gas supply/discharge system and configured to be chemically reacted in the fuel cell and
      oxygen included in the oxidizing gas of the gas passage sealed by the inlet valve and the outlet valve and configured to be chemically reacted
      to be greater than a minimum standard of 2 during the operation stop of the fuel cell; and
   calculation unit programmed to calculate the molar quantities of hydrogen configured to be chemically reacted in the fuel gas supply/discharge system and oxygen configured to be chemically reacted in the oxidizing gas supply/discharge system, wherein hydrogen is supplied in accordance with the magnitude of a cell voltage in the fuel cell so as to maintain the molar ratio as the target value, wherein the molar ratio based on the theoretical formula is used as a standard, and wherein the calculation unit is further programmed to calculate hydrogen supply in accordance with the magnitude of a cell voltage in the fuel cell so as to maintain the molar ratio of hydrogen and oxygen as the target value at a minimum standard of more than 2, and wherein the control unit is further programmed to form a hydrogen-rich state in which hydrogen is present more abundantly than oxygen in the region where the electrochemical reaction can occur so that both an anode and a cathode of the fuel cell are brought into a hydrogen atmosphere in which oxygen is not present or is hardly present in the vicinity of both the anode and the cathode of the fuel cell, and so that abnormal potential can be suppressed while inhibiting the occurrence of the chemical reaction.

9. A control method of a fuel cell system which is provided with a fuel cell, and a fuel gas supply/discharge system and an oxidizing gas supply/discharge system with respect to the fuel cell, comprising:

using an inlet valve provided on the side of an oxidizing gas supply path of a gas passage and an outlet valve provided on the side of an oxidizing gas discharge path for a purpose of sealing an oxidizing gas in the gas passage of the oxidizing gas supply/discharge system, and a supply valve of a fuel gas provided on the side of a fuel gas supply path of the fuel gas supply/discharge system;

setting the target value of the molar ratio of:
hydrogen included in the fuel gas of the fuel gas supply/discharge system and configured to be chemically reacted in the fuel cell and oxygen included in the oxidizing gas of the gas passage sealed by the inlet valve and the outlet valve and configured to be chemically reacted to be greater than a minimum standard of 2 during the operation stop of the fuel cell;

calculating the molar quantities of hydrogen configured to be chemically reacted in the fuel gas supply/discharge system and oxygen configured to be chemically reacted in the oxidizing gas supply/discharge system; and supplying hydrogen in accordance with the magnitude of a cell voltage in the fuel cell to control the molar ratio of hydrogen and oxygen configured to be chemically reacted in the fuel gas and the oxidizing gas during the stop of the fuel cell, wherein the molar ratio based on the theoretical formula is used as a standard, and wherein hydrogen is supplied in accordance with the magnitude of a cell voltage in the fuel cell so as to maintain the molar ratio of hydrogen and oxygen as the target value at a minimum standard of more than 2, and a hydrogen-rich state is formed in which hydrogen is present more abundantly than oxygen in the region where the electrochemical reaction can occur so that both an anode and a cathode of the fuel cell are brought into a hydrogen atmosphere in which oxygen is not present or is hardly present in the vicinity of both the anode and the cathode of the fuel cell, and so that abnormal potential can be suppressed while inhibiting the occurrence of the chemical reaction.

* * * * *